US008738195B2

(12) United States Patent
Aldridge et al.

(10) Patent No.: US 8,738,195 B2
(45) Date of Patent: May 27, 2014

(54) INFERENCING ENERGY USAGE FROM VOLTAGE DROOP

(75) Inventors: Tomm V. Aldridge, Olympia, WA (US); James Y. Song, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 547 days.

(21) Appl. No.: 12/887,222

(22) Filed: Sep. 21, 2010

(65) Prior Publication Data

US 2012/0072389 A1     Mar. 22, 2012

(51) Int. Cl.

| G05D 3/12 | (2006.01) |
|---|---|
| G05D 5/00 | (2006.01) |
| G05D 9/00 | (2006.01) |
| G05D 11/00 | (2006.01) |
| G05D 17/00 | (2006.01) |
| G06F 19/00 | (2011.01) |
| G01R 21/06 | (2006.01) |
| G01R 25/00 | (2006.01) |
| G01R 27/00 | (2006.01) |
| G01R 13/00 | (2006.01) |
| G01R 29/26 | (2006.01) |
| G08B 21/00 | (2006.01) |
| G06E 1/00 | (2006.01) |
| G06E 3/00 | (2006.01) |
| G06F 15/18 | (2006.01) |
| G06G 7/00 | (2006.01) |
| G08B 23/00 | (2006.01) |
| G08C 15/06 | (2006.01) |
| G08C 19/20 | (2006.01) |
| G05B 11/01 | (2006.01) |
| G08C 19/16 | (2006.01) |

(52) U.S. Cl.
USPC ............ 700/298; 700/92; 700/291; 700/293; 702/62; 702/65; 702/73; 706/20; 340/12.32; 340/635; 340/661; 340/693.9; 340/870.03

(58) Field of Classification Search
CPC ......... G06Q 50/06; Y04S 10/30; Y04S 20/38; Y04S 20/42; Y04S 20/221; Y04S 20/242; Y04S 20/32; Y04S 40/12; Y04S 40/121; G05B 15/02; G05B 19/02; G05B 2219/2642; H02J 13/0079; H02J 13/0082; H02J 2003/143; Y02B 90/2607; Y02B 90/2615; Y02B 70/3216; Y02B 70/325; Y02B 70/3266; Y02E 40/72; G01R 19/2513; G01R 21/00; G01R 21/1331; G01R 22/00; G01R 22/06; G05F 1/66; G05F 1/70; G06F 1/3203; G06F 1/189; G06F 11/3062; H04L 2012/2843; H04L 67/125
USPC ............ 700/91–93, 286, 291, 292, 295, 297, 700/298, 293; 702/57, 60–62, 64–66, 71, 702/73; 705/14.1, 400, 412; 706/15, 16, 20, 706/25, 45, 46, 54; 713/300, 320, 34; 340/500, 540, 657, 660, 661, 693.5, 340/693.9, 693.11, 870.01–870.03, 12.32, 340/635
See application file for complete search history.

(56) References Cited

U.S. PATENT DOCUMENTS 6,993,417 B2 *   1/2006   Osann, Jr. .................... 700/291
7,188,260 B1 *   3/2007   Shaffer et al. ................ 713/300

(Continued)

FOREIGN PATENT DOCUMENTS

WO      2012/040301 A2     3/2012
WO      2012/040301 A3     6/2012

OTHER PUBLICATIONS

International Search Report and Witten Opinion received for PCT Patent Application No. PCT/US2011/052512 mailed on Apr. 18, 2012, 10 pages.

(Continued)

*Primary Examiner* — Crystal J Barnes-Bullock (57) ABSTRACT

Methods and devices capable of measuring, analyzing, and monitoring electrical energy consumption of appliances and devices within a building are provided. Voltage sensors that are optionally connected to electrical socket outlets are employed within a building or section of a building to infer the identity of electricity-consuming devices and the amount of power the devices are consuming individually and collectively. Energy use inferencing devices according to embodiments of the invention provide ease of installation, simplicity, manageability, and ease-of-use that can engender deployment by electricity consumers, such as, home owners and businesses.

15 Claims, 7 Drawing Sheets

(56) References Cited

U.S. PATENT DOCUMENTS

| | | | |
|---|---|---|---|
| 7,406,365 | B2 | 7/2008 | Pratt |
| 7,526,391 | B2 * | 4/2009 | Bickel .............................. 702/57 |
| 7,778,734 | B2 * | 8/2010 | Oswald et al. ................ 700/276 |
| 7,921,307 | B2 * | 4/2011 | Karam et al. ................. 713/300 |
| 8,099,619 | B2 | 1/2012 | Dibene |
| 8,156,055 | B2 * | 4/2012 | Shimada et al. ............... 706/12 |
| 8,355,827 | B2 * | 1/2013 | Egnor et al. .................. 700/291 |
| 8,374,729 | B2 * | 2/2013 | Chapel et al. ................. 700/295 |
| 2006/0066321 | A1 | 3/2006 | Gasperi |
| 2006/0226850 | A1 | 10/2006 | Stitt |
| 2006/0241880 | A1 | 10/2006 | Forth et al. |
| 2009/0195349 | A1 * | 8/2009 | Frader-Thompson et al. 340/3.1 |
| 2010/0005331 | A1 * | 1/2010 | Somasundaram et al. .... 713/340 |
| 2010/0070217 | A1 * | 3/2010 | Shimada et al. ................ 702/62 |
| 2010/0094475 | A1 | 4/2010 | Masters et al. |
| 2010/0191487 | A1 * | 7/2010 | Rada et al. ...................... 702/60 |
| 2011/0071694 | A1 * | 3/2011 | Mammone ................... 700/291 |
| 2011/0153246 | A1 * | 6/2011 | Donaldson et al. ............. 702/65 |
| 2011/0251807 | A1 * | 10/2011 | Rada et al. ...................... 702/61 |
| 2011/0313582 | A1 * | 12/2011 | van Megen et al. ........... 700/292 |
| 2011/0320170 | A1 * | 12/2011 | Pathak et al. ................. 702/183 |
| 2012/0265586 | A1 * | 10/2012 | Mammone ................... 705/14.1 |

OTHER PUBLICATIONS

Shwetak N. Patel, "At the Flick of a Switch: Detecting and Classifying Unique Electrical Events on the Residential Power Line," UbiComp, 2007, pp. 271-288.

Steven B. Leer, "Transient Event Detection in Spectral Envelope Estimates for Nonintrusive Load Monitoring," IEEE Transactions on Power Delivery, 1995, pp. 1200-1210, vol. No. 3.

Christopher Laughman, "Power Signature Analysis," IEEE Power & Energy Magazine, Mar./Apr. 2003, pp. 56-63.

International Preliminary Report on Patentability Received for PCT Patent Application No. PCT/US2011/052512, mailed on Apr. 4, 2013, 8 pages.

* cited by examiner

INFERENCING ENERGY USAGE FROM VOLTAGE DROOP

BACKGROUND OF THE INVENTION

1. Field of the Invention

The embodiments of the invention relate generally to methods and devices for monitoring and analyzing electrical energy consumption, consumer energy usage, identifying devices that are consuming electrical energy, determining line impedance, and measuring and analyzing voltage changes within a building.

2. Background Information

Increasing concerns about global climate change create urgency to move toward systems that are able to provide energy savings advantages. Employing a Smart Grid, an intelligent energy generation, transmission, and distribution system, can provide energy savings. The potential of the Smart Grid lies in its integration and usage of Information Computing Technology (ICT) to deliver greater energy efficiency than is available with the current electrical grid. Meeting energy optimization challenge, in part, involves imbuing the current infrastructure with improved measuring, monitoring, inference, control, actuation, and manageability at many levels of the grid, including at the very edges of the infrastructure where there are an ever-increasing number of end-user devices and appliances. Each of these smart venues may potentially provide energy savings, not only by decreasing the demand of energy during peak load times on a multiuser electrical grid, but also by using less energy overall.

DETAILED DESCRIPTION OF THE INVENTION

Heightened awareness of the cost of various behavioral and usage patterns can ultimately decrease energy consumption and slow down its negative environmental impact. Embodiments of the present invention provide methods and devices capable of measuring, analyzing, and monitoring electrical energy consumption of devices within a building. Sensors are employed within a building or section of a building to infer the identity of electricity-consuming devices and the amount of power the devices are consuming individually and or collectively. Embodiments of the invention provide ease of installation, simplicity, manageability, and ease-of-use that can engender deployment by home owners and businesses. Deployment of sensing systems within the space being monitored aids end-users in controlling the data generated. Embodiments of the invention enable the adoption of edge-device energy monitoring and improvements in consumer energy efficiency.

Throughout the present disclosure, electrical energy may be referred to in terms that are specific to a geographic locale and type of end user for purposes of illustration, however, embodiments of the invention are employable in other locales having different standards for the delivery of electrical energy to end users and different types of end users. For example, electrical energy is typically delivered to end users in the United States at 60 Hz and approximately 120 V (i.e., between 114 and 126 V most of the time). In other countries, for example, power is generated at 50 Hz or a mixture of 50 Hz and 60 Hz and can vary from about 120 V to about 240 V. Other frequencies and voltages for alternating current (AC) are also possible.

Figure 1:
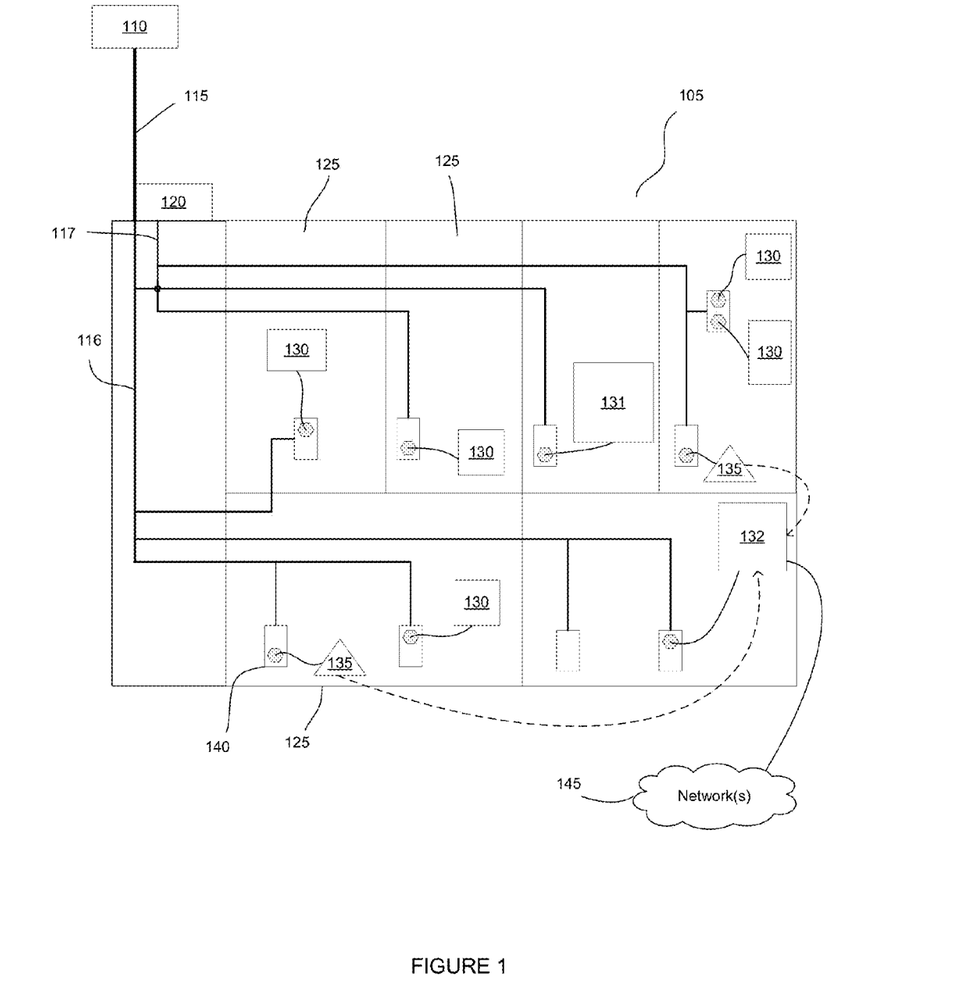
FIG. 1 shows the deployment of a system for detecting and analyzing energy consumption within a building.

FIG. 1 provides a system for monitoring electrical energy usage within a building. The building is a business or a residence or part thereof and is, for example, a home, an office, a factory, a store, or other place of business or residence in which electricity-consuming devices are employed. In FIG. 1, electrical energy is supplied to a building 105 from the local electrical grid 110 as alternating current (60 Hz) through power line 115. Two lines 116 and 117 that are each at approximately 120 V supply electrical power to rooms 125 in the building. For some larger energy-consuming device(s), the two branches 116 and 117 are joined so that the device(s) receive 240 V. The amount of power consumed by the building 105 (or a section thereof) is typically measured by power meter 120. Optionally, the power meter 120 is capable of transmitting information regarding recorded energy usage for the building (either through hard wiring or wirelessly). The rooms 125 contain various devices 130, 131, and 132 that use power in varying amounts at varying times during the day and night. In this embodiment, two electrical power usage monitors 135 are supplied, one for each 120 V branch, however, other numbers of monitors are possible. For monitoring an entire building or section of a building in which power is delivered in two branches, at least two electrical power usage monitors 135 are employed in order to monitor each branch and achieve a value for the energy consumption of the building or section of the building being monitored.

Figure 2:
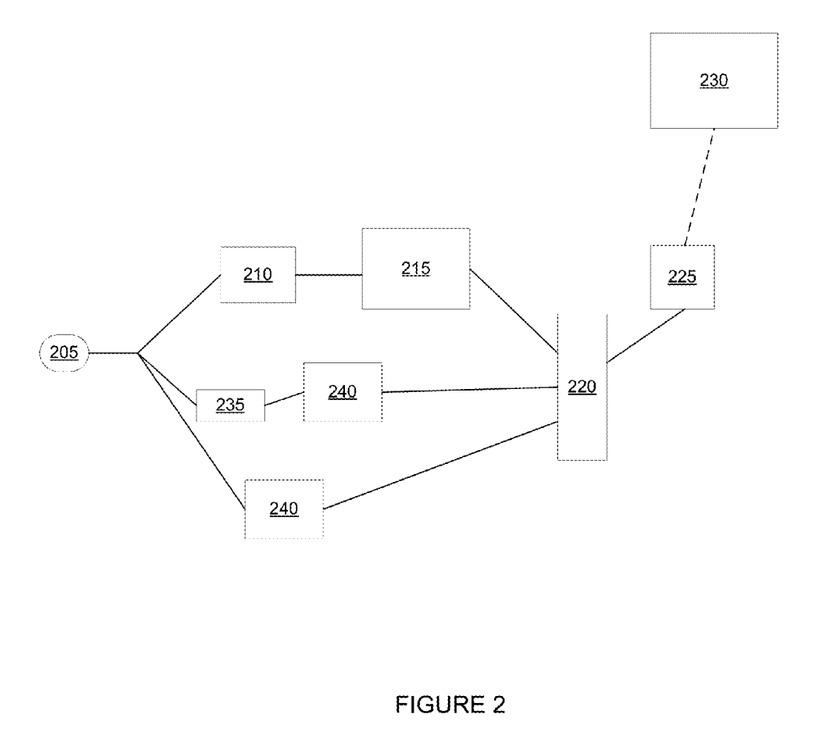
FIG. 2 provides a device that plugs into an AC (alternating current) socket and that is useful for monitoring electrical energy usage in a building.

Electricity-consuming devices 130, in FIG. 2, are devices configured to operate on 120 Volts typically found in a home, such as, for example, lights, televisions, video equipment, audio equipment, computers, security systems, heaters, air purifiers, air conditioners, printers, faxes, microwave ovens, coffee makers, toasters, some ovens, some clothes washers, dish washers, water heaters, clocks, thermostats, and clothes dryers. Electricity-consuming devices 131 are devices that use 240 V power typically found in a home, and are, for example, electric clothes driers, electric clothes washers, dish washers, air conditioners, heaters, electric water heaters, electric ovens, and refrigerators. The preceding lists are exemplary and certainly not exhaustive of the types of electricity-consuming devices monitorable according to embodiments of the invention. Electricity-consuming device 132 is a computer system that receives input from electrical power usage monitors 135, either wirelessly, or through wired connections. Computer system 132 is optionally connected to the internet 145 and is able to receive data from and send data to remotely located computer systems. Usage monitors 135 are plugged into socket outlets 140, and the two usage monitors 135 are each plugged into a socket outlet 140 that is powered by a different branch (116 and 117) of the power line 115. In alternate embodiments, the electrical power usage monitors 135 are operably coupled to the power lines 116 and 117 without an intervening plug and socket combination.

In general, computer system 132 is a data processing system comprised of a computer and various input and output devices, such as, for example, displays, keyboards, pointing devices (such as mice and joysticks), modems, and data storage devices. The computer system 132 encompasses a single machine or a system of communicatively coupled machines or devices operating together. Example computer system elements include, without limitation, distributed computing systems, supercomputers, high-performance computing systems, computing clusters, mainframe computers, minicomputers, client-server systems, personal computers (PCs), workstations, servers, portable computers, laptop computers, tablet computers, personal digital assistants (PDAs), telephones, handheld devices, entertainment devices such as audio and/or video devices, and other devices for processing or transmitting information. Optionally, computer system 132 is not located within building 105 being monitored.

Typically a computer has a processing system, including a processor that is communicatively coupled to one or more volatile or non-volatile data storage devices, such as random access memory (RAM), read-only memory (ROM), mass storage devices such as serial advanced technology attachment (SATA) or small computer system interface (SCSI) hard drives, and or devices capable of accessing media, such as floppy disks, optical storage, tapes, flash memory, memory sticks, CD-ROMs and or digital video disks (DVDs). The term ROM refers to non-volatile memory devices such as erasable programmable ROM (EPROM), electrically erasable programmable ROM (EEPROM), flash ROM, and or flash memory. The processor may also be communicatively coupled to additional components, such as video controllers, SCSI controllers, network controllers, universal serial bus (USB) controllers, and input devices. Communications between elements of the computer system, additional processors, and or the electrical usage monitors can occur using various wired and or wireless short range protocols including, USB, WLAN (wireless local area network), radio frequency (RF), satellite, microwave, Institute of Electrical and Electronics Engineers (IEEE) 802.11, Bluetooth, optical, fiber optical, infrared, cables, and lasers.

In some embodiments, computer system 132 is communicatively coupled to a second processor (not shown) that runs software for driving the electrical power usage monitors 135 and receives, stores, and or analyzes data from the electrical power usage monitors 135. Computer system 132 additionally typically comprises software for driving the electrical power usage monitors 135 (in the absence of a second processor), for communicating with the second processor and receiving data from the second processor, for analyzing data and providing a user electrical power usage data, directing the storage of data, and or accessing a database of appliance signatures, and a display device (not shown) for displaying raw and or analyzed data relating to energy consumption. Software for energy usage monitoring is optionally provided to computer system 132 on a computer readable medium that is accessed locally, such as on devices such as floppy disks, flash memory devices, digital video disks, and CD-ROMs, and or is available for download from an internet site where it is stored in memory in a computer readable format. As discussed further herein, computer system 132 may also comprise a database of appliance signatures stored in an accessible memory device and or a computer readable format. Databases of appliance signatures are also optionally stored in memory devices accessible through the internet or on devices such as hard drives, floppy disks, flash memory devices, digital video disks, and CD-ROMs. Optionally, the computer system 132 gathers data from the power meter 120 (either wirelessly, through wired connections, or data is input by a user) and uses the power meter data in conjunction with the data from the power usage monitors 135 to generate information regarding energy usage within the building 105.

FIG. 2 provides a device capable of determining line impedance and operating as a voltage sensor for inferring which appliances are operating and how much power they are consuming. The impedance determination is an optional element of the device of FIG. 2. The device of FIG. 2, an electrical power usage monitor, plugs into a socket outlet (not shown) that delivers electrical energy to a building using plug 205. Plug 205 allows the electric power lines of a building to be monitored by the electrical power usage monitor. In alternate embodiments, the electric usage monitor is more directly connected the electric power line being monitored without an intervening plug/socket combination. An advantage of the plug/socket combination is that it allows installation of electrical power usage monitors by individuals who are not necessarily skilled in the electrical wiring of buildings. Plug 205 is electrically connected to electronics for measuring voltage and also (optionally) to electronics that allow the measurement of line impedance. The electronics for measuring voltage include, a transformer 210 capable of stepping down the AC power input to the analog to digital converter 215 (ADC or A/D converter) that measures the voltage. The transformer 210-ADC 215 coupling also includes a bias circuit (not shown) capable of centering the bias voltage at a known value. The analog to digital converter is, for example, a 13B SPI A/D (MCP3303) (an A/D converter typically used for sound generation) or a VSK-S3-3R3U. In operation for an exemplary embodiment, the output of the VAC transformer 210 is biased at a reference voltage (such as, for example, Vref=2.5V) filtered at 240 Hz using an RC (resistor-capacitor circuit) filter, and the voltage is scaled with a 1 K potentiometer to approximately 5 V peak output for 130 V VAC input. In embodiments of the invention, a 10 bit A/D converter was used, however the use of other A/D converters with the same or different resolution values is possible. The ADC 215 is operably connected to a general purpose input/output controller (GPIO) 220 which is in turn operably connected to a controller 225 (such as, for example, through a USB interface) that has a processor capable of running software, the software that drives the operation of an electrical power usage monitor, operably coupled memory for storing the software, and input/output capabilities. Controller 225 is operably connected to a host computer system 230 that is capable of receiving data from controller 225, storing the data, analyzing the data, and outputting the raw and analyzed data. In alternate embodiments, some or all of the functions of controller 225 are performed by the host computer system 230. Host computer 230, is, for example, wirelessly ((IEEE) 802.11) connected to controller 225.

Optional impedance determination circuitry in electrical power usage monitor of FIG. 2 comprises, resistor 235 that is capable of applying a known load and that is connected in series to a triode for alternating current (TRIACs or bidirectional triode thyristor) 240. In FIG. 2, one resistor-coupled TRIAC unit is provided, although other numbers are also possible, such as, for example, a number of units that is from one to twenty five or more. In general, the number of resistor-TRIAC units employed depends in part on the types of resistors and TRIACs employed, the amount of heat generated by the resistor-TRIAC units (and the amount of time necessary for the resistor-TRIAC units to cool between voltage sampling measurements), and cost of manufacture concerns and it is possible to employ larger numbers of resistor-TRIAC units. The TRIACs 240 are operably connected to TRIAC drivers (not shown), such as for example, MOC3036 and MOC3010 random-phase optoisolators, which are operably connected to GPIO 220 that allows controller 225 to pulse the TRIACs 240 and measure the voltage for the known load provided by resistors 235. Resistors 235 are, for example, 40 Ohm (25 W) resistors or 3.5 Ohm PTC (positive temperature coefficient) thermistors. In embodiments in which resistors 235 are PTC thermistors, a thermal measurement device (not shown) capable of measuring the operating temperature of the resistors is optionally provided. Thermal measurement devices are operably connected to GPIO 220. A thermal measurement device is added to allow a calibration curve in software to enhance the accuracy of the PTC thermistor. Additionally, the thermal measurement device determines the starting temperature and therefore that thermistor resistances are within valid ranges in our calibration routine.

An exemplary calculation is as follows. The electrical power usage monitor collects samples of the AC voltage with an isolation transformer, attenuator, and bias circuit to accurately center the bias at $V_{3.3}/2$ and then presents it to a 10 bit ADC for conversion to digital format. The 60 Hz (or 50 Hz in the European Union, for example) sine wave is sampled at greater than N samples per second to achieve necessary resolution of peak data and zero crossings. Sampling yields a max error in peak voltage of:

$$\text{Error}=1-\cos(2\pi f_o/N),$$

where $f_o$ is the fundamental power line frequency. At 10 bit resolution of a 3.3 V peak to peak (p-p) signal representing a $400 V_{p-p}$ line voltage (approx $120 V_{rms} \pm 20\%$) and an assumed typical $R_{line}$ of 0.5 Ohm the usage monitor would report a power of:

$$P_{1b}=\frac{1}{4}V_{max}^2/(2^{20}R_{line})=76 \text{ mW (approx.)}$$

for each bit of peak voltage droop from the maximum voltage measured. For a sample rate, N, that supports a 1 W resolution or approximately 13 times what the 10 bit sampling provides, the sample rate error dominates. Therefore, since the minimum error is given by:

$$V_{min}=(P_{min}*R_{line})^{0.5}=0.707 \text{ V},$$

a minimum sample rate is:

$$S_{min}=2\pi f_o/a\cos(1-(V_{min}/V_{max}))=4482 \text{ per second}.$$

A range of voltage sampling rates that is useful is between 500 and 10,000 samples per second, between 1,000 and 5,000 samples per second, and between 3,000 and 5,000 samples per second.

The AC line resistance is used to compute line current from measured voltage drops. An optical coupled TRIAC driven by a programmable GPIO enables timed electrical current bursts to a nonlinear positive temperature coefficient (PTC) thermistor. The PTC thermistor is used to provide a meaningfully strong calibration current without adding excessive average power draw inside the sensor case and to provide a failsafe method to limit the time the calibration is applied regardless of the state of the sensor controller. Current flow for 100 ms can provide for a complete burst signal while minimizing heat generated on the PTC thermistor. Additionally, a temperature sensor on the PTC thermistor ensures consistent and accurate resistance values. The measured values provide calculated AC line impedance and a reference voltage droop/power correlation.

Line impedance is, for example, calculated as follows: Maximum voltage ($V_{max}$) is set to 400 V and to calculate actual line voltage, the count, $N_{init}$, the voltage just prior to firing the TRIAC, is known. The PTC thermistor is applied across the AC line and minimum voltage is observed. In this example, the PTC thermistor is a 3.8 Ohm cold device with a minimum resistance $R_{min}=3.2$ Ohms which occurs in its heating cycle. Maximum current is achieved at 3.2 Ohms and then rapidly recovers to a very small value based on the PTC thermistor characteristic. The voltage value when the current is a very small value is $N_{min}$:

$$V_{init}=V_{max}*N_{init}/N_{max} \text{ and } V_{min}=V_{max}*N_{min}/N_{max}$$

$$I_{max}=V_{min}/R_{min} \text{ and then } R_{line}=(V_{max}-V_{min})/I_{max} \text{ and}$$

$$R_{line}=((N_{max}/N_{min})-1)R_{min} \text{ or } R_{line}=((V_{max}/V_{min})-1)R_{min}.$$

Some example values are: $N_{max}=1024$, $N_{min}=900$, $R_{min}=3.2$ giving $R_{line}=0.44$ Ohms. In the above, $N_{init}$ is a value sampled from the A/D converter for the voltage on the line, $V_{max}$ is the maximum voltage for the line being measured, and $V_{min}$ is the voltage on the line when the resistance of the PTC thermistor is at its minimum.

The impedance of a power delivery line ($R_{line}$) in a building is determined according the following relationship:

$$R_{line}=((N_{max}/N_{min})-1)*(\text{thermistor } R \text{ value})$$

where $N_{max}$ is a calibration value for the A/D converter that represents the maximum voltage that can be measured on the device and $N_{min}$ is the minimum voltage value measured on the A/D converter when the PTC thermistor has a resistance value that is the minimum resistance value for the PTC thermistor. The thermistor R value is the minimum R value supplied by a PTC thermistor. The relationship can alternatively be expressed as:

$$R_{line}=((V_{max}/V_{min})-1)*(\text{thermistor } R \text{ value})$$

where $V_{max}$ is the maximum voltage for the line being measured, and $V_{min}$ is the voltage on the line when the resistance of the PTC thermistor is at its minimum.

For the embodiment employing known resistive loads that are not PTC thermistors, the PTC thermistors behave as loads placed across the line, which can be switched in. A known load across the line and a measurement of the voltage, allows the impedance upstream to be estimated. The voltage drop obtained with respect to the known resistive load, allows the current to be calculated. An estimate of the power being drawn from the lines is obtained from the voltage measurement.

The power used by an electric appliance is calculated, for example, using the equation $P=V^2R$, where P is the power, V is the measured voltage droop on the electrical line as a result of the appliance being on and drawing power from the line, and R is the impedance of the electrical line of the house. The amount of energy used can be determined from the summation of the measured voltage changes over time attributable to the appliance. In the alternative, the energy consumed by an appliance can be determined, for example, after the identity of the device is determined, from a source of appliance operating characteristics that provide information regarding the energy usage of the appliance as a function of time and the measured amount of time the device is operational. Further, the measured value for energy usage for the appliance can be compared to the published value for the appliance to determine if the appliance is functioning within expected parameters. An unusually high power consumption rate for an appliance, for example, can be an indication that the appliance is in need of service (such as, for example, that a filter needs to be replaced in a home heating unit).

When current is applied through the PTC thermistor, an $N_{ratio}$ factor is calculated to correlate a voltage droop to power usage. Current (I) is calculated using the known PTC thermistor resistance: $I=V_{rms}/(\text{thermistor } R \text{ value})$. Power is calculated by the product of $V_{rms}$ (this is a measured value for root mean square voltage) and the calculated current (I) value. The $N_{ratio}$ factor is calculated by correlating the calculated power with the observed voltage droop which is the difference of the calibration pulse ($N_{max}-N_{min}$):

$$N_{ratio}=(V_{rms}/(\text{thermistor } R \text{ value}))*(V_{rms}/(N_{max}-N_{min})).$$

Figure 3A:
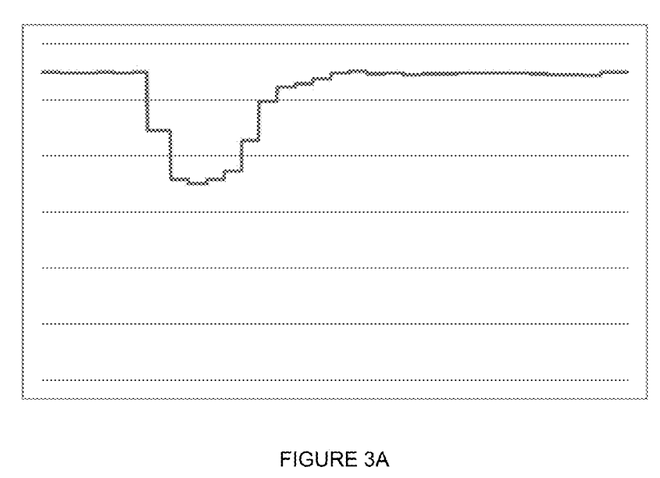
FIGS. 3A through 3H show measured voltage signatures for various devices, including common household appliances, and frequency signatures for a microwave oven.
Figure 3B:
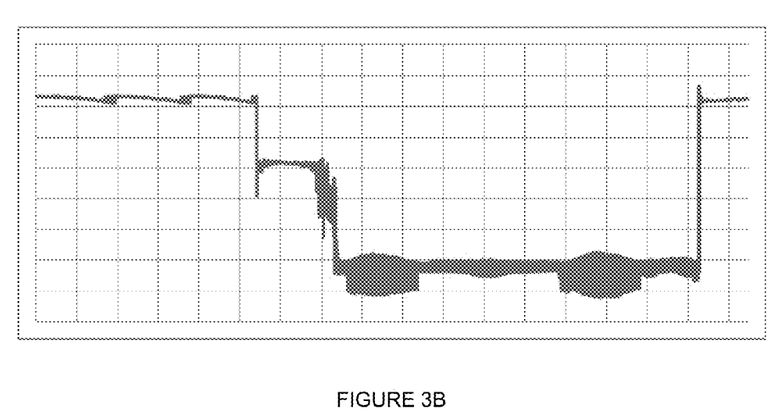
Figure 3C:
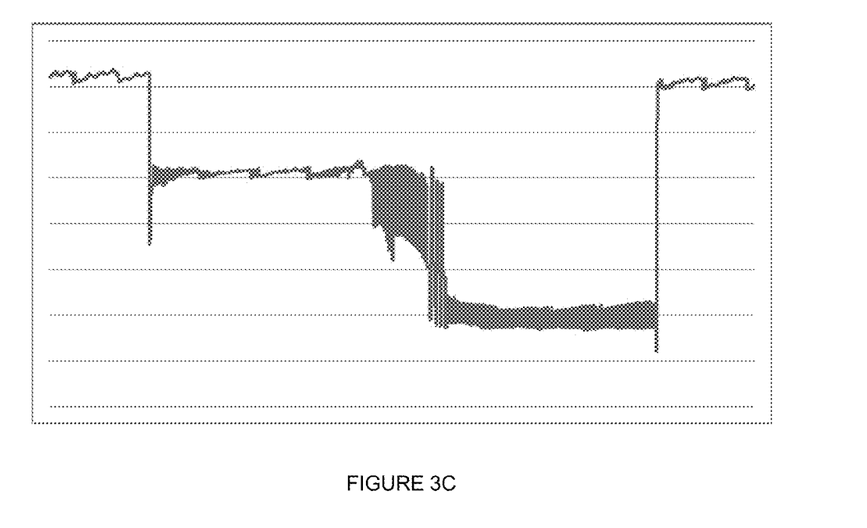
Figure 3D:
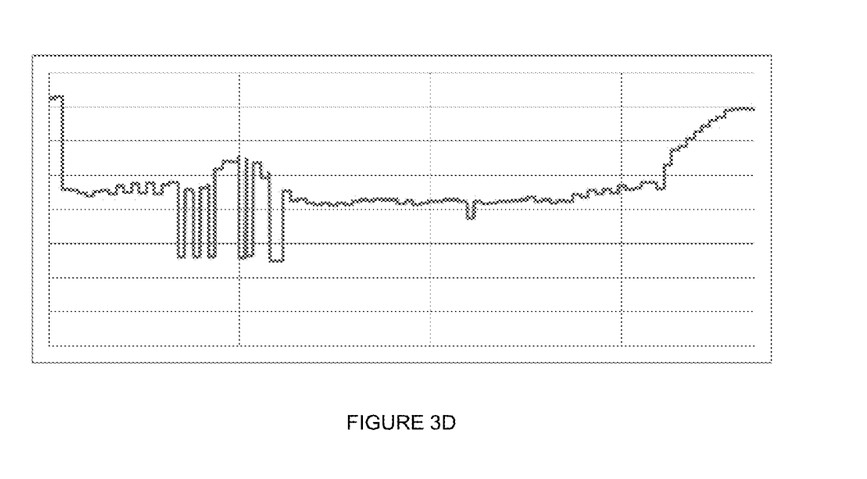
Figure 3E:
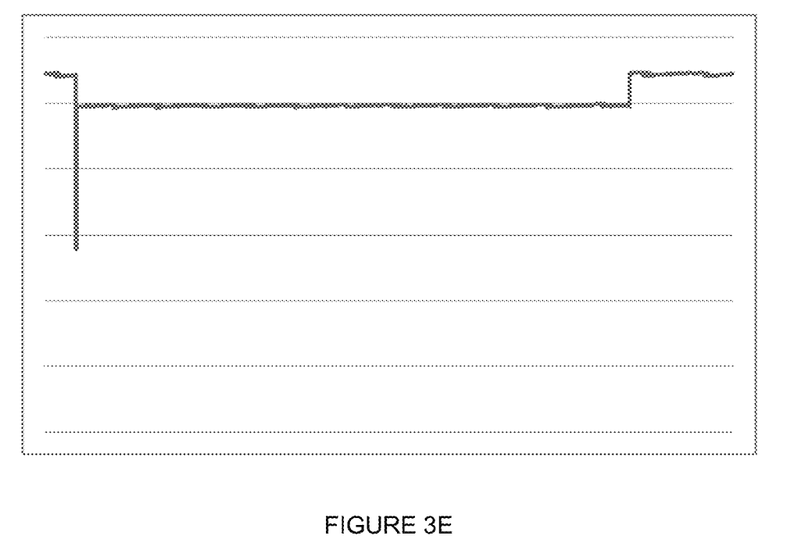
Figure 3F:
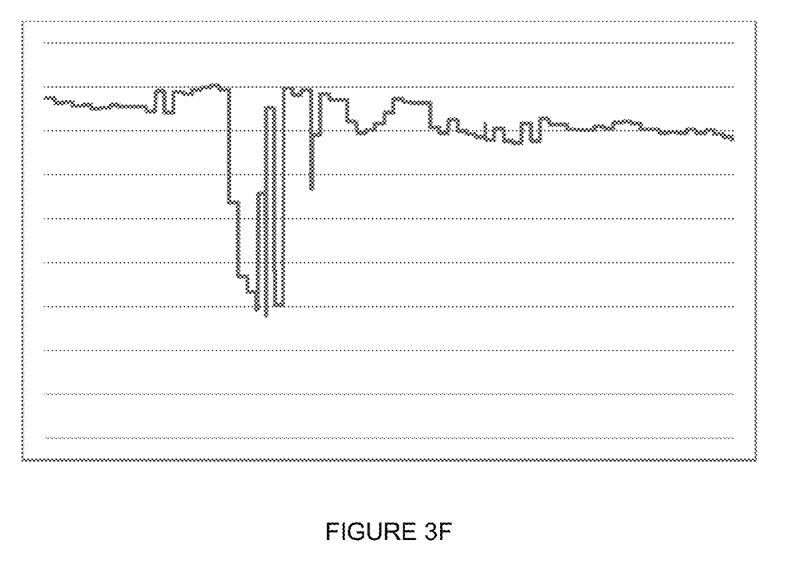

FIGS. 3A-F show voltage signatures for a PCT thermistor and household appliances that were obtained through monitoring the voltage droop on the electrical power line to which the appliances were connected as a function of time. For the voltage signatures of FIG. 3, the appliances were turned on and the voltage signal was captured at 4,000 samples per second at 10 bit resolution. The 4K sampling rate provides about 66.67 samples for each complete 60 Hz waveform, therefore about 33.33 samples for each positive/negative peak value are available to use for signal analysis and appliance identification. In general, for appliance measurements, the appliances were attached to a 120 V line that was monitored using a device similar to that of FIG. 2. In FIG. 3, the y axis (the vertical axis) is voltage (V) and the x axis is time in seconds. FIG. 3A shows the voltage signature for the PTC thermistor used to calculate line impedance. In FIG. 3A, the voltage signature for the calibration pulse is shown, and $N_{init}$ is the value before the voltage starts to drop, and $N_{min}$ is the count at the bottom of the dip in the voltage. FIG. 3B shows the voltage signature for a microwave oven on high power and FIG. 3C shows the voltage signature for a microwave oven on low power. FIG. 3D show the voltage signature for a refrigerator, FIG. 3E shows the voltage signature for a toaster, and FIG. 3F shows the voltage signature for a LED television (LED (light emitting diode)).

Figure 4:
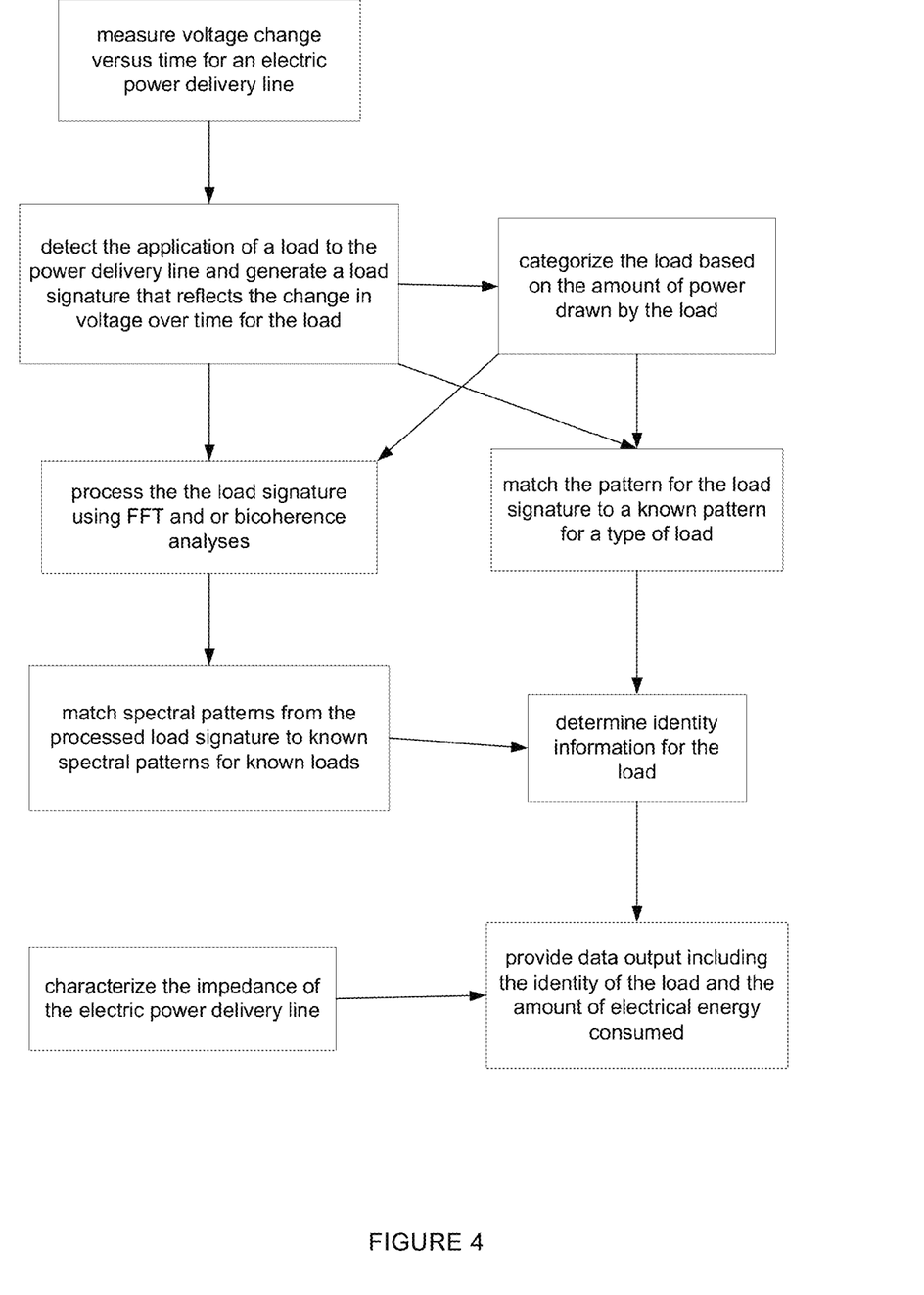
FIG. 4 provides a flow chart describing a method for identifying appliances from their measured voltage signatures.

In embodiments of the invention, energy usage in a building is inferenced according to the method illustrated by FIG. 4. Voltage signatures for electric devices (i.e., loads) consuming power from an AC electric power delivery line in a building are obtained by measuring power line voltage as a function of time. Values for the line voltage are captured at a sampling rate of between 500 samples per second and 10,000 samples per second and a signature for the appliance (load) is generated. Optionally, event detection is used to initiate pattern analysis. An event is detected when a load is applied to the AC line and a voltage droop having a value above a selected value is detected. For example, event detection can be initiated when a 50 Watt correlated voltage droop is detected.

Optionally, the load is initially characterized according to the magnitude of the voltage droop. In determining the identity of the load, the range of possibilities for the identity of the load is optionally narrowed to a group of possible devices that create a similar magnitude of voltage drop (within a selected range). In embodiments of the invention, the voltage drop at or near the beginning of device operation is selected for the initial characterization, although it is also possible to select a voltage drop at a different time value. The pattern created by the voltage signature for the load (the measured voltage as a function of time over a selected time period of operation), is compared to voltage signature(s) in a database of voltage signatures for known devices to determine the identity of the load.

Voltage signal analysis (pattern matching) occurs using a peak detector for both the positive and negative amplitude of the 60 Hz sine wave. Pattern matching occurs using some and or all of the voltage signature obtained. In general, a voltage signature optionally begins when the device is turned on and optionally ends when the device is turned off, although a voltage signature for less than the full time the device is turned on is possible. Typically, for devices that are in operation for long periods of time, voltage signatures obtained at the beginning of operation are used initially in pattern matching analysis. In some instances, the beginning of the voltage signature as the appliance is turning on is especially informative with respect to the identity of the device. For example, pattern matching occurs using a portion of the voltage signature obtained after the device is turned on, such as the first thirty seconds to five minutes of the voltage signatures, or a portion thereof. If no pattern match is found, the pattern matching process is optionally repeated using more of and or different time periods of the voltage signature. A threshold value is chosen for the minimum percentage match for the pattern necessary to identify an appliance. The threshold value chosen depends on the type of device and the frequency of the stored pattern. Ultimately, threshold values are chosen that provide a desired level of accuracy for appliance identification.

Figure 3G:
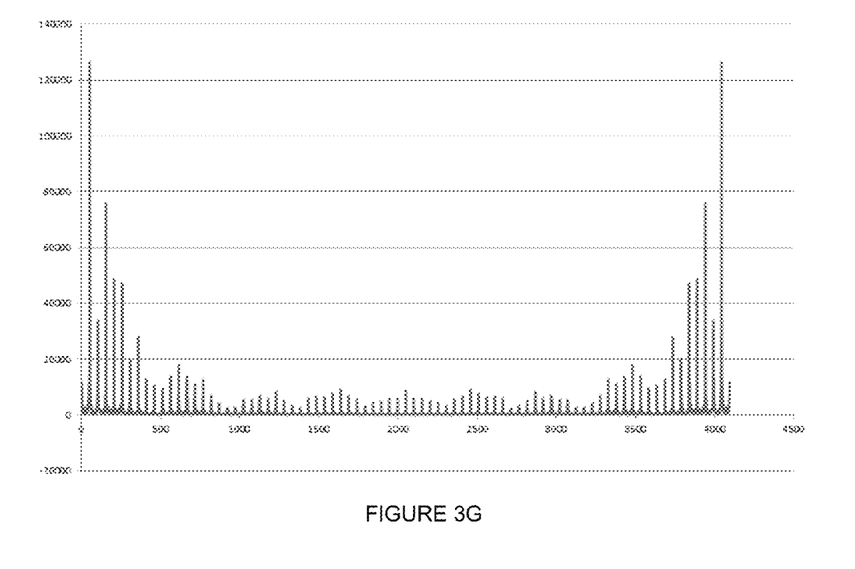
Figure 3H:
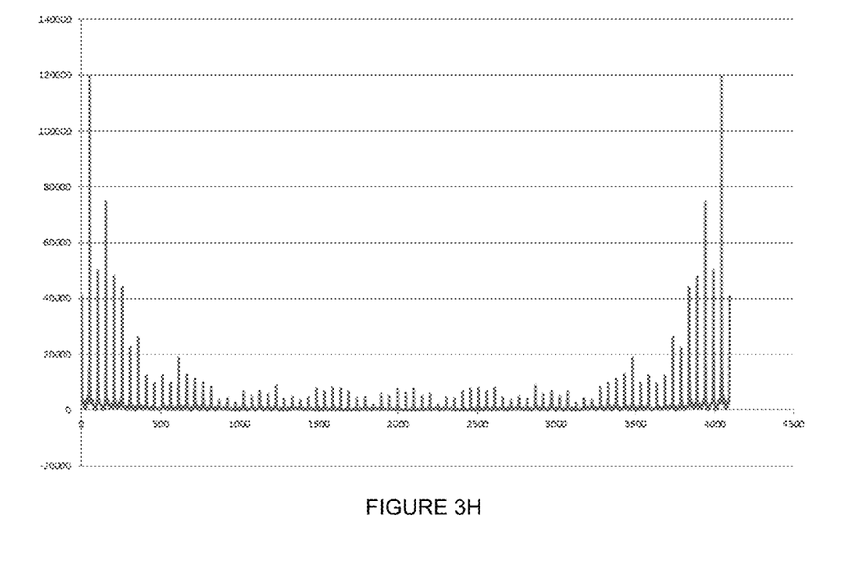

Additional analyses are optionally performed on the voltage signatures detected. For example, fast four transform (FFT) and bicoherence algorithms can yield spectral frequency signatures that can be matched to known spectral signatures for appliances that are also stored in a database. Fast four transform (FFT) and bicoherence algorithms are applied to some and or all of the voltage signature obtained, particularly in the transient stages of the appliance. In some instances, the beginning of the voltage signature as the appliance is turning on is especially informative with respect to producing distinctive spectral signatures that allow the identity of the device to be determined. Simple identification of the voltage signature can aid in selecting windows of data to be analyzed in the frequency domain. FIGS. 3G and 3H show the frequency analysis of two measurements of the turn on of a microwave magnetron. In FIGS. 3G and 3H, the y axis represents the number of occurrences for a particular frequency and the x axis is frequency. The window of data is the magnetron turn on event and a FFT analysis has been performed. The two graphs demonstrate a strong pattern that can be used for pattern matching and device identification.

Together, voltage/time analysis (voltage signature matching), windowed frequency analysis, along with statistical analysis and likelihood of device turn on results in a composite score of likelihood that a particular device or scenario of devices turned on. A composite device detection score can be used to identify an electrical device that is operating. The composite device detection score takes into account the observed behavior of the appliance within its operating environment, the voltage/time pattern matching (voltage signature matching), and frequency signal matching for portions of the voltage signature. For example, the device may only be or typically be used during certain periods of the day, such as a toaster that is used primarily four times in the morning, a water heater that goes on periodically through out the day, a microwave with a distinct frequency signal due to the charging of the magnetron, or a washing machine with a predictable timed pattern behavior found in the voltage signature. A particular portion of the composite device detection score may receive a higher weighted score depending on the behavior of the device. For example, the statistical usage analysis score for the toaster goes higher during periods in which the toaster is expected to be operational, the washing machine may receive a higher weight for voltage signature pattern matching, and the microwave may receive a higher weight for frequency pattern matching. Further, if data is available from additional devices, such as, for example, the thermostat in the building, appliance identity for heaters and air conditioners can be determined using the data from the thermostat indicating the appliance is in operation.

In instances in which two AC lines are provided in the building being monitored for electrical energy usage, the detection of simultaneous voltage signatures by electrical power usage monitors attached to each line indicates an appliance is drawing power from both lines. In this instance, the voltage measured by one electrical power usage monitor is doubled, or the voltage from usage monitor(s) associated with the first 120 V line is added to the voltage drop found at the usage monitor(s) associated with the second 120 V line to determine the power used by the appliance and also optionally to perform voltage signature pattern matching for appliance identification.

Two appliances that turn on simultaneously within detection limits are typically a rare occurrence. In the instance in which no pattern match is found and or when the initial voltage droop is not an expected value disaggregation is performed, for example, by subtracting known voltage signatures from the observed voltage signature and performing pattern matching analysis on the resulting voltage signature in the time and frequency domain. Similarly, for the situation in which three or more appliances turn on simultaneously within detection limits, two or more known voltage signatures are subtracted from the observed voltage signature and pattern matching is performed on the resulting voltage signature after subtraction. In the situation in which a second load turns on at some point after a first load has turned on, disaggregation is performed, for example, by subtracting known voltage signatures from the observed voltage signature and performing pattern matching analysis on the resulting voltage signature. Further verification is done with spectral analysis on windowed, transient data points.

Pattern matching for voltage and frequency signatures involves the comparison of a signature obtained from an electric-power-using device attached to the electrical power line being monitored with signatures for known appliances. A database is created containing voltage signatures of appliances and the identity of the appliance associated with the voltage signature. The database can also contain frequency signatures for appliances and the identity of the appliance associated with the frequency signature. Within the energy consumption monitoring system, the database of known signatures is stored either locally on a data storage device operably coupled to the processor performing the pattern matching analysis and or on one or more databases accessible through the internet cloud. Typically, the database, in order to be useful, will have a large number of signatures for known appliances. However, depending on the end use, a smaller database containing known devices previously detected in the environment is also useful. In embodiments of the invention the database has at least 10 signatures. The database of known voltage signatures is populated with voltage signatures obtained from a source external to the building being monitored and or obtained from a signature measured on the electric power line being monitored. A local database is optionally extended to one or more databases that exist in the internet cloud. The database is optionally populated with additional signature information, such as frequency signatures resulting from fast four transform (FFT) and bicoherence analysis of the transient states of the electrical device. Optionally, the database also comprises rankings for spectra that are indicative of likelihood that the device will be a device deployed in a home. In operation, the database is optionally modified to create group(s) of appliances that are known to be in the building being monitored and during system operation these groups can be used for pattern matching first.

In one embodiment, pattern matching is performed using the locally stored data and if no pattern match is found, the search for a matching pattern is extended to voltage and frequency signatures available through the internet. If a pattern match is found, the voltage signature and identity of the associated appliance is stored in the local database. The result is that all electrical devices detected in the environment are stored in the local database. Information stored in database format for an appliance can include initial and transient time based on and off patterns, a complete time based voltage signature with data windows for frequency analysis, and or spectral signatures of relevant windows of the transient data. Database information also optionally includes a general pattern of usage in frequency and time of usage Pattern matching analysis becomes faster as the universe of appliances in the building being monitored is determined and pattern matching can occur in a first pass using the universe of known appliances within the building. If no match is found then voltage signatures from outside the universe of known appliances are used for pattern matching. Optionally, a user may input an identity value to be associated with a particular load for some or all of the loads being monitored. For example, if the user plugs in a freezer in the garage and a voltage signature is sensed by the energy monitoring system as the freezer turns on, the user can assign a value to the particular signature that is captured by the energy monitoring system, such as "freezer in the garage," and can also optionally input manufacturer information. The voltage signature for the identified appliance is stored in the database and associated with the group of appliances known to be operating within the house. The next time the freezer turns on, the system optionally searches first within the group of appliances known to be operating within the house to identify the freezer as the appliance operating and generating the recorded voltage signature.

Further, the database can also be populated with usage information indicative, for example, of how often and when the device is likely to be used, and whether the device is likely to be used in conjunction with other devices, for statistical behavior analysis.

Optionally the impedance of the building power line is determined once and the value obtained is used to determine electrical energy consumed by appliances drawing power from the building power line. Alternatively, the impedance of the line is determined repeatedly at intervals during the collection of voltage information from the AC power line.

Guidance is optionally provided for electrical energy usage monitor user installation by software associated with a computer system that is receiving and analyzing data for the electrical energy usage monitors. A user that is installing electrical energy usage monitors in a home setting, for example, may encounter a situation in which there are two different AC lines that need to be monitored in order to capture the energy usage within the entire home. Without access to a wiring chart for the home, the user might not know which lines or socket outlets coupled to which AC lines. After installation of the electrical energy usage monitors, the detection of the same voltage events on both usage monitors simultaneously is an indication that the monitors have been installed on the same AC line and one monitor needs to be moved until it is installed on the different AC line. The user is alerted to this situation and advised to move a monitor until the monitors are located on the two different lines.

Energy consumption is determined using values for the impedance of the lines and the measured values for voltage drop as a function of time. User interfaces are provided for displaying energy consumption data as a function of time and as a function of identity of appliance. The energy consumption for a device is optionally output, for example, as an amount of energy per unit of time (such as an hour, a day, and or a week, etc.), an amount of energy consumed for an on/off cycle for the device, and or in a continuous update format, such as power being currently consumed by devices currently in operation.

If the energy consumption of an identified appliance changes or increases over time, an alert is optionally provided. An increase in energy consumption for an electric heater can, for example, indicate that the filter associated with the heater is clogged and needs to be cleaned. For appliances without a distinctive signature, such as for example, lights, additional sensors are optionally employed to determine the periods of operation for the appliance, such as, for example, photodetectors (photocells) and vibration sensors. Some appliances may additionally come with sensors for determining when they are operational. Sensor information is transferred to the computer system for recording and analysis.

Persons skilled in the relevant art appreciate that modifications and variations are possible throughout the disclosure and combinations and substitutions for various components shown and described. Reference throughout this specification to one embodiment or an embodiment means that a particular feature, structure, material, or characteristic described in connection with the embodiment is included in at least one embodiment of the invention, but does not necessarily denote that they are present in every embodiment. Furthermore, the particular features, structures, materials, or characteristics may be combined in any suitable manner in one or more embodiments. Various additional layers and/or structures may be included and/or described features may be omitted in other embodiments.

We claim:

1. A method for determining the identity of an electric energy consuming device, comprising,
   capturing values for voltage supplied by an electric power delivery line in a building as a function of time from an electrical power usage monitor attached to a socket outlet of the electric power delivery line wherein the electrical power usage monitor is capable of detecting a voltage supplied by the electric power delivery line and wherein the electrical power usage monitor is operably connected to a processor wherein the processor is capable of directing the capture of voltage values by the electrical power usage monitor and is capable of causing the storage of data in a memory device,
   creating a voltage signature for an unknown electric energy consuming device that is connected to the electric power delivery line wherein the voltage signature comprises detected values in the voltage supplied by the electric power delivery line as a function of time during the operation of the unknown electric energy consuming device and wherein the unknown electric energy consuming device is directly connected to the electric power delivery line through a socket outlet and is not connected through the electrical power usage monitor,
   determining the identity of the unknown electric energy consuming device based on the similarity of the voltage signature of the unknown electric energy consuming device to the voltage signature of a known electric energy consuming device.

2. The method of claim 1 wherein attaching occurs by plugging the electrical power usage monitor into a socket outlet that is electrically connected to the electrical power delivery line being monitored.

3. The method of claim 1 wherein the voltage is captured at a sampling rate of between 500 and 10,000 samples per second.

4. The method of claim 1 wherein the voltage is captured at a sampling rate of between 3000 and 5000 samples per second.

5. The method of claim 1 wherein determining the identity includes performing fast Fourier transform or bicoherence analysis on all or part of the voltage signature of the unknown electric energy consuming device and matching the resulting frequency spectrum to that of a known electric energy consuming device.

6. The method of claim 1 wherein the voltage signature used to determine the identity of the unknown electric energy consuming device is obtained during the first thirty seconds of operation of the electric energy consuming device.

7. The method of claim 1 also including creating a composite device detection score for use in identifying the electric energy consuming device based on a statistical analysis of the observed usage patterns for the electric energy consuming device.

8. A method for monitoring the electrical energy consumption in a building, comprising
   capturing values for the voltage supplied by an electric power delivery line in a building as a function of time from an electrical power usage monitor attached to a socket outlet of the electric power delivery line wherein the electrical power usage monitor is capable of detecting a voltage supplied by the electric power delivery line and wherein the electrical power usage monitor is operably connected to a processor wherein the processor is capable of directing the capture of voltage values by the electrical power usage monitor and is capable of causing the storage of data in a memory device and storing the values in the memory device,
   creating a voltage signature for an unknown electric energy consuming device that is connected to the electric power delivery line wherein the voltage signature comprises detected values in the voltage supplied by the electric power delivery line as a function of time during the operation of the unknown electric energy consuming device and wherein the unknown electric energy consuming device is directly connected to the electric power delivery line through a socket outlet and is not connected through the electrical power usage monitor,
   determining the identity of the unknown electric energy consuming device based on the similarity of the voltage signature of the unknown electric energy consuming device to the voltage signature of a known electric energy consuming device, and
   calculating a value for the power consumed by the identified electric energy consuming device as a function of time using the values obtained for the changes in voltage associated with the operation of the device and a value for the impedance of the electric power delivery line.

9. The method of claim 8 wherein the electrical power usage monitor is also capable of determining a value for a voltage drop on electrical power delivery line when a known resistive load is applied to the electrical power delivery line.

10. The method of claim 9 wherein the impedance of the electric power delivery line is determined by
   obtaining a value for a voltage drop on electrical power delivery line when a known resistive load is applied to the electrical power delivery line, and
   dividing the maximum voltage in the power delivery line by the voltage measured when the known resistive load is placed across the line, subtracting the number 1, and multiplying a resulting value by the resistance of the known resistive load.

11. The method of claim 8 wherein the voltage is captured at a sampling rate of between 500 and 10,000 samples per second.

12. The method of claim 8 wherein the voltage is captured at a sampling rate of between 3000 and 5000 samples per second.

13. A computer readable storage medium storing instructions that when executed by a computer cause the computer to perform a method of monitoring the electrical energy consumption in a building, the method comprising:

capturing values for the voltage supplied by an electric power delivery line in the building as a function of time from an electrical power usage monitor attached to a socket outlet of the electric power delivery line wherein the electrical power usage monitor is capable of detecting a voltage supplied by the electric power delivery line, storing captured values for voltage supplied by an electric power delivery line as a function of time, and creating a voltage signature for an unknown electric energy consuming device that is connected to the electric power delivery line wherein the voltage signature comprises detected values in the voltage supplied by the electric power delivery line as a function of time during the operation of the unknown electric energy consuming device and wherein the unknown electric energy consuming device is directly connected to the electric power delivery line through a socket outlet and is not connected through the electrical power usage monitor, and determining the identity of the unknown electric energy consuming device based on the similarity of the voltage signature of the unknown electric energy consuming device to the voltage signature of a known electric energy consuming device.

14. The method of claim 13 also comprising calculating a value for the power consumed by the identified electric energy consuming device as a function of time using the values obtained for the changes in voltage associated with the operation of the device and a value for the impedance of the electric power delivery line.

15. The method of claim 14 wherein the value for the impedance of the electric power delivery line is determined by obtaining a value for a voltage drop on electrical power delivery line when a known resistive load is applied to the electrical power delivery line, and dividing the maximum voltage in the power delivery line by the voltage measured when the known resistive load is placed across the line, subtracting the number 1, and multiplying a resulting value by the resistance of the known resistive load.

* * * * *